(12) United States Patent
Chessell et al.

(10) Patent No.: US 6,345,316 B1
(45) Date of Patent: Feb. 5, 2002

(54) APPARATUS, METHOD AND COMPUTER PROGRAM PRODUCT FOR CLIENT/SERVER COMPUTING WITH THE ABILITY TO SELECT WHICH SERVERS ARE CAPABLE OF CREATING TRANSACTION STATE DATA

(75) Inventors: Amanda Elizabeth Chessell, Alton; Martin Mulholland; Kathryn Sarah Warr, both of Winchester, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/094,071

(22) Filed: Jun. 9, 1998

(30) Foreign Application Priority Data

Feb. 12, 1998 (GB) ............................................... 9802885

(51) Int. Cl.[7] ............................................... G06F 15/16
(52) U.S. Cl. ....................... 709/330; 709/101; 709/201; 709/217; 709/311; 709/316
(58) Field of Search ............................... 709/203, 219, 709/243, 101, 201, 217, 218, 311, 316, 330

(56) References Cited

U.S. PATENT DOCUMENTS 5,136,708 A * 8/1992 Lapourtrre et al.
5,287,537 A * 2/1994 Newmark et al.

(List continued on next page.)

FOREIGN PATENT DOCUMENTS

| EP | 0613083 | 8/1994 | |
|----|---------|--------|--|
| EP | 0707265 A2 * | 8/1997 | ............. G06F/9/46 |
| EP | 0834807 A * | 8/1997 | ............. G06F/9/46 |

OTHER PUBLICATIONS

Douglas Schmidt and Steve Vinoski, Comparing Alternative Programming Techniques for Multireaded CORBA Servers, C ++ Report, pp. 47–56, Jul. 1996.*

At&T et al., Common Obect Services Specification, vol. 1, Jon Siegel, pp. 1–112, Mar. 1994.*

IBM, SOMobjects Developer's Toolkit Programmer's Guide, vol. 1:SOM and DSOM, p. 1–449, Jul. 1996.*

The Essential Distributed Objects Survival Guide by Robert Orfali published by John Wiley & Sons, p. 128, 1996.*

*Primary Examiner*—Mark H. Rinehart
*Assistant Examiner*—Stephen Willett
(74) *Attorney, Agent, or Firm*—Edward H. Duffield

(57) ABSTRACT

A server processing method for use in a client/server computing system which carries out transactions, includes steps of: receiving a command from a client process to signify the beginning of a transaction; determining whether a local transaction creator exists; and forwarding on the command to another server if a local transaction creator does not exist and for locally creating transaction state data if a local transaction creator does exist.

4 Claims, 5 Drawing Sheets

U.S. PATENT DOCUMENTS

| | | | | |
|---|---|---|---|---|
| 5,459,837 A | * | 10/1995 | Caccavale | |
| 5,644,720 A | * | 7/1997 | Boll et al. | |
| 5,761,507 A | * | 6/1998 | Govett | |
| 5,774,660 A | * | 6/1998 | Brendel et al. | |
| 5,774,668 A | * | 6/1998 | Choquier et al. | |
| 5,857,102 A | * | 1/1999 | McChesney et al. | |
| 5,864,866 A | * | 1/1999 | Henckel et al. | |
| 5,872,971 A | * | 2/1999 | Knapman et al. | |
| 5,907,847 A | * | 5/1999 | Goldberg | |
| 5,918,017 A | * | 6/1999 | Attanasio et al. | |
| 5,920,863 A | * | 7/1999 | McKeehan et al. | 707/10 |
| 5,923,833 A | * | 7/1999 | Freund et al. | |
| 5,925,095 A | * | 7/1999 | High, Jr. et al. | 709/2 |
| 5,931,907 A | * | 8/1999 | Davies et al. | 709/218 |
| 5,938,732 A | * | 8/1999 | Lim et al. | |
| 5,949,772 A | * | 9/1999 | Sugikawa et al. | |
| 5,949,998 A | * | 9/1999 | Fowlow et al. | |
| 5,968,116 A | * | 10/1999 | Day, II et al. | |
| 5,978,594 A | * | 11/1999 | Bonnell et al. | |
| 5,999,968 A | * | 12/1999 | Tsuda | |
| 6,014,686 A | * | 1/2000 | Elnozahy et al. | |
| 6,016,495 A | * | 1/2000 | McKeehan et al. | |
| 6,038,587 A | * | 3/2000 | Phillips et al. | 709/101 |
| 6,038,589 A | * | 3/2000 | Holdsworth et al. | 709/201 |
| 6,044,224 A | * | 3/2000 | Radia et al. | |
| 6,046,988 A | * | 4/2000 | Schenkel et al. | |
| 6,063,129 A | * | 5/2000 | Dadd et al. | |
| 6,070,197 A | * | 5/2000 | Cobb et al. | |

* cited by examiner

APPARATUS, METHOD AND COMPUTER PROGRAM PRODUCT FOR CLIENT/SERVER COMPUTING WITH THE ABILITY TO SELECT WHICH SERVERS ARE CAPABLE OF CREATING TRANSACTION STATE DATA

FIELD OF THE INVENTION

The invention relates to the field of client/server (also known as "distributed") computing, where one computing device ("the client") requests another computing device ("the server") to perform part of the client's work. The client and server can also be both located on the same physical computing device.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (called CORBA—the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. See, e.g., CORBA Object Transaction Service Specification 1.0, OMG Document 94.8.4. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g, 10) communicating with one particular server computer (e.g., 20) over a series of client requests which are processed by the server. The OMG's OTS is responsible for coordinating these distributed transactions.

Usually, an application running on a client process begins a transaction which may involve calling a plurality of different servers, each of which will initiate a server process to make changes to its local database according to the instructions contained in the transaction. The transaction finishes by either committing the transaction (and thus all servers finalize the changes to their local databases) or aborting the transaction (and thus all servers "rollback" or ignore the changes to their local databases). To communicate with the servers during the transaction (e.g., instructing them to either commit or abort their part in the transaction) one of the processes involved must maintain state data for the transaction. This usually involves the process to set up a series of transaction objects, one of which is a coordinator object which coordinates the transaction with respect to the various servers.

A conventional implementation of the OTS, which was developed by the International Business Machines Corporation and included in its Component Broker Series (a trademark of the IBM Corp.) product announced in May of 1997, is shown in FIG. 2. A client process 21 which wants to begin a transaction (e.g., to withdraw money from a bank account) needs to locate a process which is capable of creating and holding the transaction objects that will maintain the state of the transaction. As the modern tendency is to create clients that are "thin" (and thus have only the minimum functionality), the client process 21 will usually not be able to maintain the transaction objects locally and must look for a server process for this purpose.

According to this prior art approach, the OTS (or another service, such as the CORBA Lifecycle service) arbitrarily assigns a server process on which to create the transaction objects 221 (which typically include the Coordinator, Control and Terminator objects). The same server process (server A process 22 in FIG. 2) is always chosen according to this prior art. Upon locating the server A process 22, client process 21 sends (arrow with encircled number 1) a message to server A process 22 to instruct server A process 22 to create the transaction objects 221. Server A process 22 then creates transaction objects 221 and sends a reply (arrow with encircled number 2) containing the transaction context to client 21. Client 21 then sends a debit bank account command (arrow with encircled number 3) to server B process 23 (the process containing the bank account object 231 which the client process 21 wishes to withdraw money from). This latter command carries with it the transaction context supplied to the client 21 by the server A process 22. In this way, the bank account object 231 in process 23 can register itself (arrow with encircled number 4) with the transaction objects 221 in process 22 so that the bank account object 231 can be commanded (arrow with encircled number 5) to commit or rollback by the transaction objects 221 at the end of the transaction.

The system designer may want to maintain the transaction objects on the server where many of the resources likely to be involved in the transaction exists, in order to reduce the number of cross-process calls. Alternatively, in other cases, a designer may want to create and maintain the transaction objects on a server which does not have local resources so as not to load down another server with local resources. However, the prior art implementation does not allow the system designer to select which servers will be used to create and maintain the transaction objects.

SUMMARY OF THE INVENTION

According to a first aspect, the present invention provides a server processing apparatus for use in a client/server computing system which carries out transactions, the apparatus having: means for receiving a command from a client process to signify the beginning of a transaction; means for determining whether a local transaction creator exists; and means for forwarding on said command to another server if a local transaction creator does not exist and for locally creating transaction state data if a local transaction creator does exist.

According to a second aspect, the invention provides a method of carrying out the functionality described above in the first aspect.

According to a third aspect, the invention provides a computer program product for, when run on a computer, carrying out the functionality of the first aspect.

According to a fourth aspect, the invention provides a server for use in a client/server computing system for executing distributed transactions, the server having a local distributed object transaction service implementation which is incapable of locally creating transaction state data.

According to a fifth aspect, the invention provides two servers for use in a client/server computing system for executing distributed transactions, each server having a local distributed object transaction service implementation, one server being capable of locally creating transaction state data, and another server being incapable of locally creating transaction state data.

Since the system designer can select which servers are capable of creating and maintaining the state data of a transaction, and which servers are not so capable, a great degree of flexibility in how the transaction is processed is attained due to the present invention.

For example, in one case, a server which has local resources can be designated as being capable of creating and maintaining transaction state data, so that the transaction objects and resource objects are located in the same process, thus reducing the number of cross-process calls required to process the transaction.

In another case, this same server can be designated as not being capable of creating and maintaining transaction state data, so that this server, which has local resources, can devote all of its processing power to updating and maintaining the local resources without having to be diverted to taking care of the transaction state objects.

BRIEF DESCRIPTION OF THE DRAWINGS

The invention will be better understood by the below description of preferred embodiments thereof to be read while referring to the following figures.

DETAILED DESCRIPTION OF THE PREFERRED EMBODIMENTS

The Common Object Request Broker (CORBA) Object Transaction Service (OTS), implemented in a server, supplies an interface object known as "CosTransactions::Transaction Factory" which can be called upon by client applications in order to create a transaction by creating the transaction state objects in the OTS server.

Figure 3:
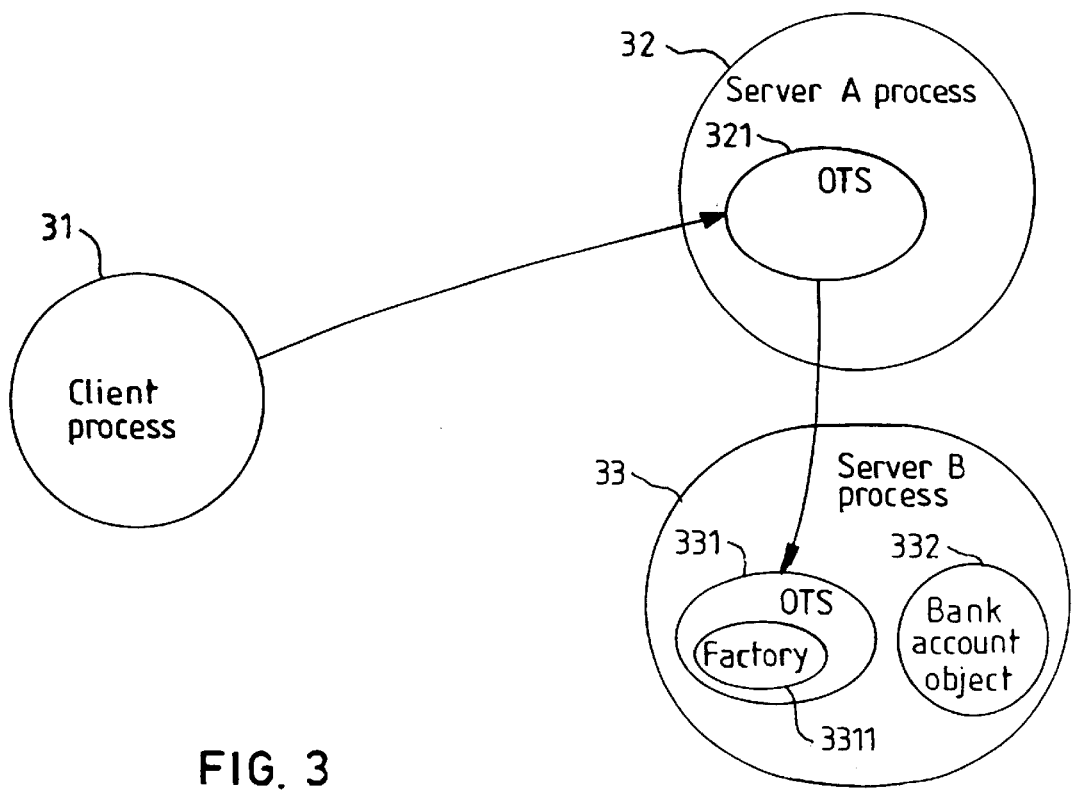
FIG. 3 is a block diagram showing a first implementation according to a preferred embodiment of the present invention.

In the preferred embodiment of the present invention, an application running in client process 31 (see FIG. 3) begins a transaction. In this illustrative example, it will be assumed that the transaction being carried out is a withdrawal of money from a bank account, a common transactional operation that is carried out on a daily basis, worldwide, using an Automated Teller Machine (ATM) as the client.

A server process 32 is then located by the client process 31 when the client begins a transaction. This is similar to the prior art implementation of FIG. 2. However, while the server process 32 has an otherwise fully functional OTS implementation 321, server process 32 does not have a transaction factory object, and is thus incapable of creating the transaction state objects, as will be explained below.

Figure 4:
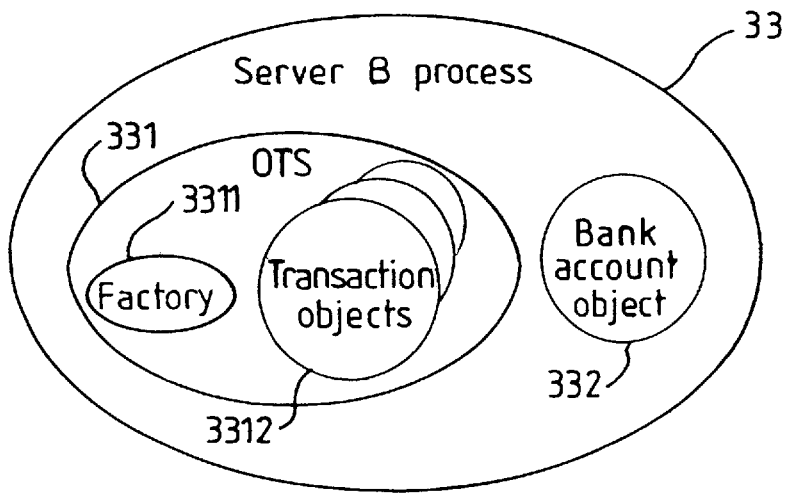
FIG. 4 is a block diagram of a server process of the first implementation of FIG. 3.

When the server process 32 receives the command from the client process 31 to begin the transaction, the server process 32 forwards this command on to another server process, such as server process 33, since server process 32 does not have the transaction factory object in its OTS 321. The server process 33, which does have the transaction factory object 3311 in its OTS 331 then proceeds to locally create (see FIG. 4) the transaction state objects 3312 (which typically include control, coordinator, and terminator objects, referred to as CosTransactions::Control, CosTransactions::Coordinator and CosTransactions::Terminator, respectively). These are analogous to the transaction objects 221 discussed above with respect to the prior art implementation of FIG. 2.

Figure 5:
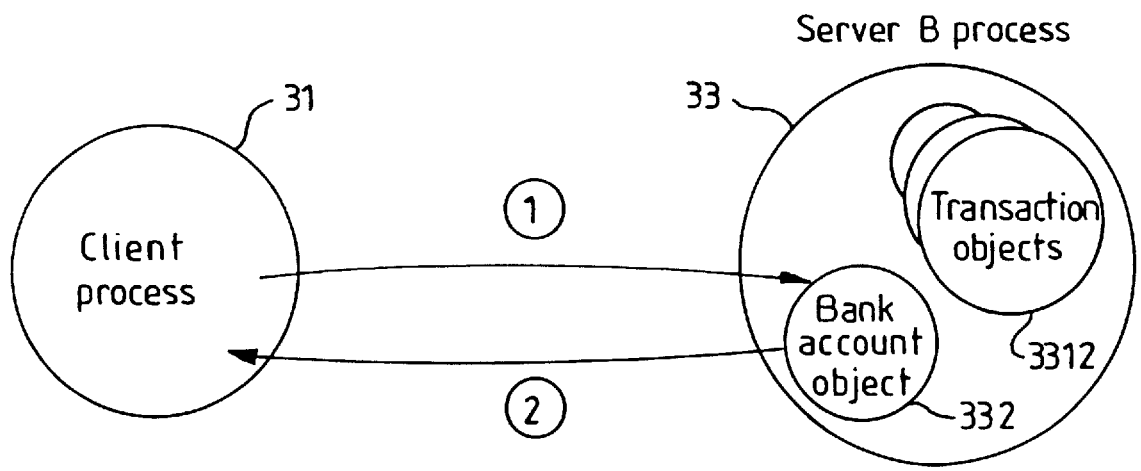
FIG. 5 is a block diagram showing the first implementation of FIG. 3 during transaction execution.

As shown in FIG. 5 the application running in the client process 31 then issues a debit command to bank account object 332 in server process 33, as the first substantive part of the withdrawal transaction. At this stage, the bank account object 332 communicates with the transaction objects 3312 in the usual way, except that all of such communication takes place within the same process and thus no cross process flows are required for such communication. In the example, the communication that takes place involves the bank account object 332 registering with the transaction objects 3312 and, when the transaction is finished, the transaction objects 3312 send a commit or rollback command to the bank account object 332.

Thus, by configuring server process 32 so that it does not have a transaction factory object within its OTS 321, a great reduction in cross process flows results as the transaction objects are instead created in server process 33 which contains the bank account object 332 as a local resource.

Figure 6:
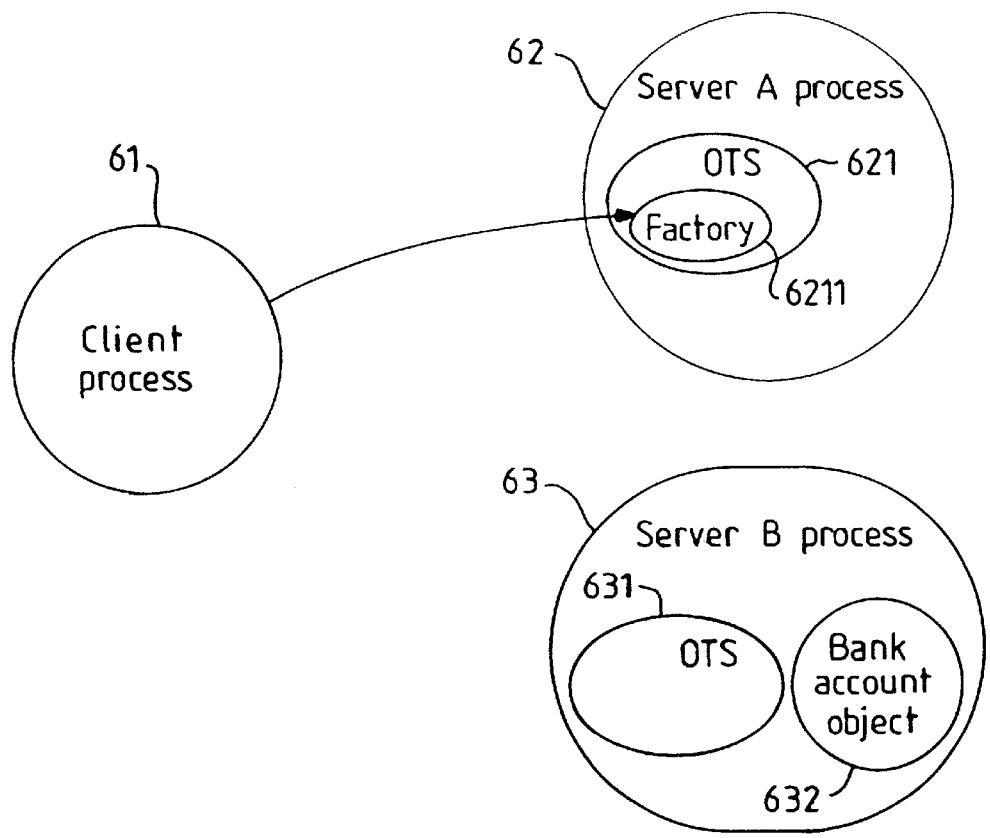
FIG. 6 is a block diagram showing a second implementation according to a preferred embodiment of the present invention.
Figure 7:
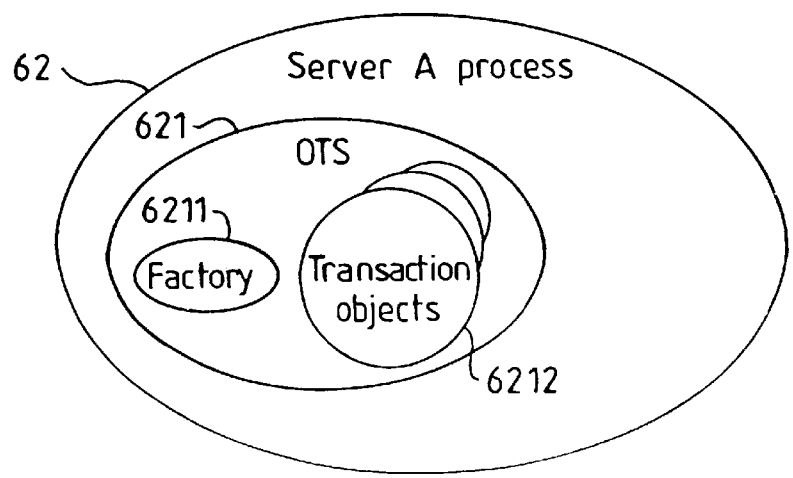
FIG. 7 is a block diagram of a server process of the second implementation of FIG. 6.

The system designer may, in another case, want to configure the system of servers so that the transaction objects are created in a server process which does not have local resource objects involved in the transaction, and this case will be described now with reference to FIGS. 6 and 7.

Client process 61 (FIG. 6) begins a transaction and sends a request to server process 62 to command it to create the transaction objects. As server process 62 has a transaction factory 6211 in its OTS 621, the server process 62 is capable of creating the transaction objects 6212 and thus creates them as shown in FIG. 7. Then, the transaction proceeds in a similar fashion to the implementation of FIG. 2 where many cross process calls are involved, as the transaction objects 6212 and the bank account object 632 are located in separate processes.

In some architectures, the client process 61 may not always contact the same server when it is making a command to begin a transaction. The client may instead contact a random server. If, for example, it attempts to contact server process 63 first, instead of process 62, with the present invention, since process 63 does not have a transaction factory object, process 63 will forward the client request on to another process (e.g., process 62) that does have a factory.

Figure 1:
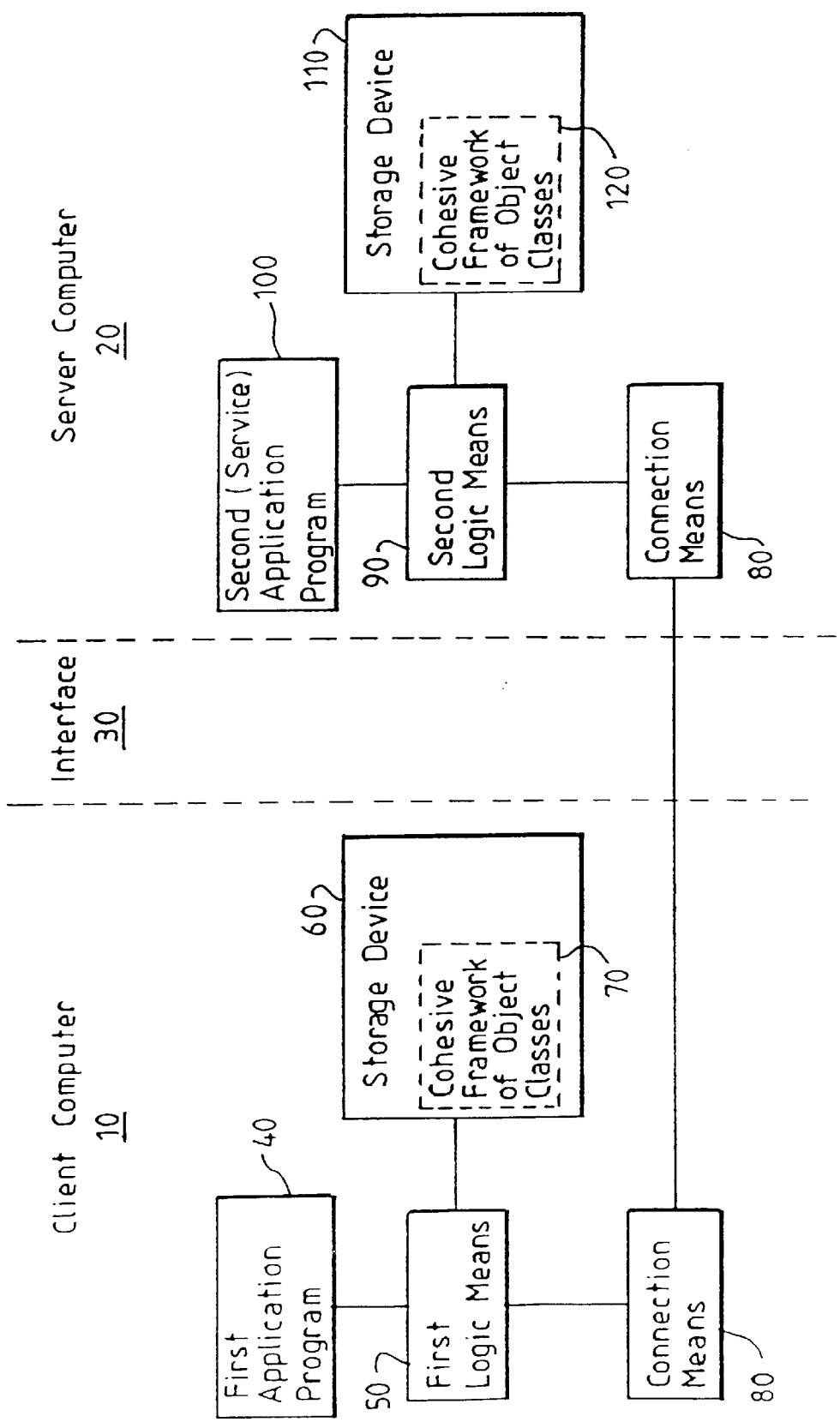
FIG. 1 is a block diagram of a conventional heterogeneous client/server architecture using object technology, in the context of which the preferred embodiment of the present invention can be applied.
Figure 2:
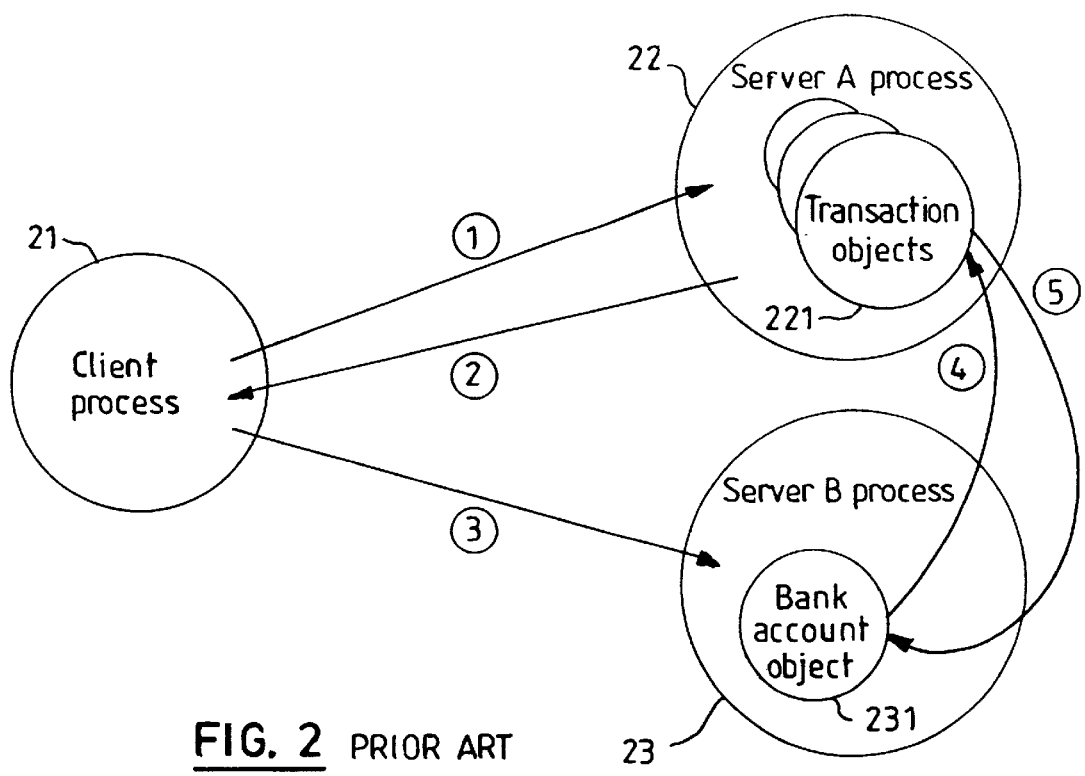
FIG. 2 is a block diagram showing a conventional OTS implementation.

While this latter case shares the disadvantage of FIG. 2 of having many cross process flows, it has the advantage of saving the process 63, which has local resources, from having to expend its processing power on creating and maintaining the transaction objects. This allows the process 63 more processing power to deal with its local resources.

In some situations, it is better to follow the first case and save on cross process flows. In other situations, it is better to follow the second case and save on processing power for the resource-bearing server process. Because of the present invention, the system designer is allowed to design the system depending on which situation is desired.

Figure 8:
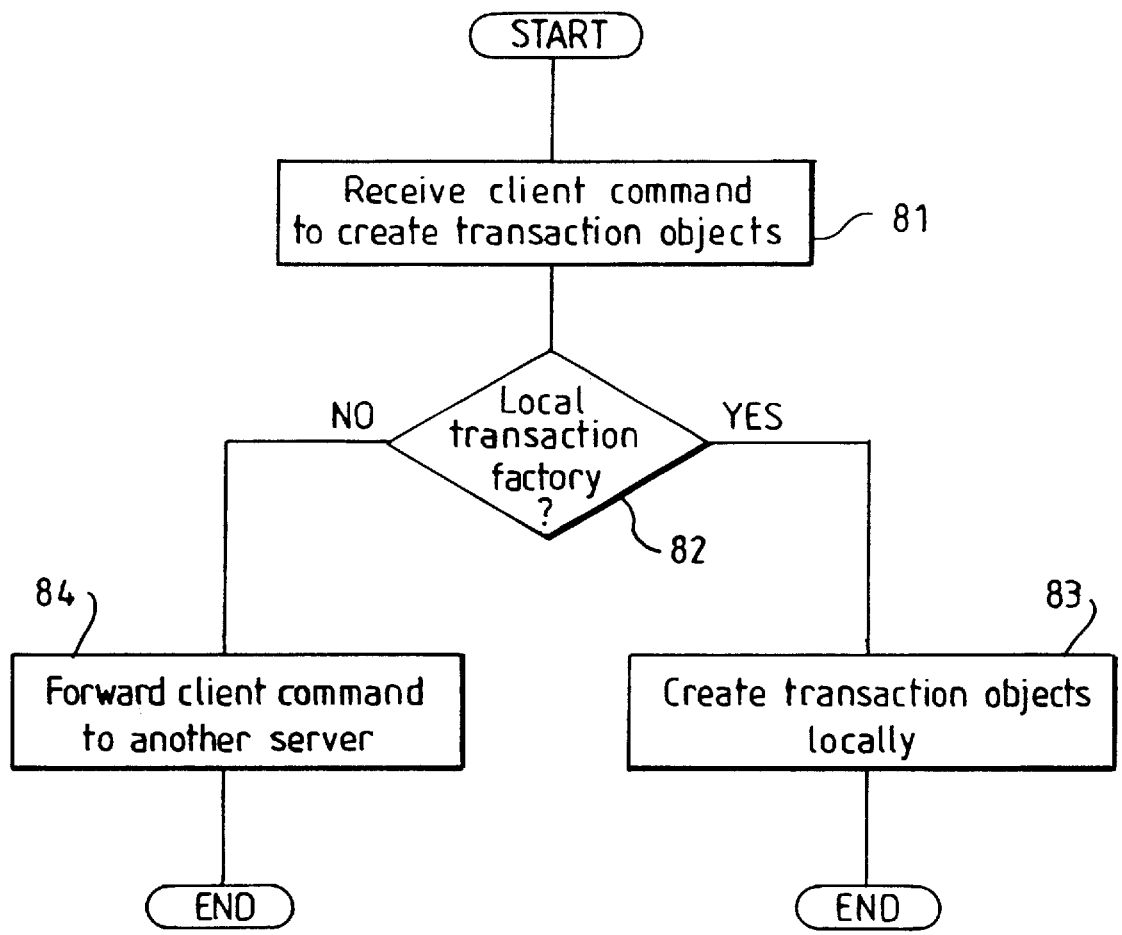
FIG. 8 is a flowchart showing the operational steps carried out according to the preferred embodiment of the present invention.

The steps carried out by a server according to the preferred embodiment are shown in FIG. 8. At step 81, the server (e.g., server process 62) receives a client command to create the transaction objects for a particular transaction that a client has started. The server then checks (step 82) to determine whether it has a local transaction factory. If it does, the server creates (step 83) the transaction objects locally within the server. However, if the server does not have a local transaction factory, the server forwards (step 84) the client command to another server.

The system designer uses a systems management interface to designate which server processes will have a factory in its OTS and which will not. Then, upon server startup, only the server processes that have been designated as transaction factory-containing processes will have a transaction factory object instantiated.

As stated above, the server that is designated as not capable of creating local transactions (the "no local transactions server") provides, otherwise, a full OTS implementation. It is able to receive transactional requests and it may contain recoverable OTS data. Thus, any application written to execute in an OTS programming model will also execute with respect to the "no local transactions" server without any modification.

We claim:

1. A server for use in a client/server computing system for executing distributed transactions, comprising:

a local distributed transaction service implementation;

means for receiving either a first designation from a systems management unit designating that the server is not to instantiate a transaction factory object upon server startup, or a second designation from a systems management unit designating that the server is to instantiate a transaction factory object upon server startup; and means for, upon server startup, instantiating a transaction factory object as part of the local distributed transaction service implementation if the means for receiving has received the second designation and for not instantiating a transaction factory object as part of the local distributed transaction service implementation if the means for receiving has received the first designation.

2. The server of claim 1 wherein said local transaction service implementation is implemented in accordance with the Common Object Request Broker Object Transaction Service standard.

3. A computer program product stored on a computer readable storage medium for, when run on a computer system, implementing a server as claimed in claim 1.

4. The computer program product of claim 3 wherein said local transaction service implementation is implemented in accordance with the Common Object Request Broker Object Transaction Service standard.

* * * * *